United States Patent
Bhargava

(10) Patent No.: US 8,237,857 B1
(45) Date of Patent: Aug. 7, 2012

(54) SYSTEM AND METHOD FOR ADJUSTING ASPECT RATIOS

(75) Inventor: Ankur Bhargava, Cambridge, MS (US)

(73) Assignee: Google Inc., Mountain View, CA (US)

( * ) Notice: Subject to any disclaimer, the term of this patent is extended or adjusted under 35 U.S.C. 154(b) by 440 days.

(21) Appl. No.: 12/560,961

(22) Filed: Sep. 16, 2009

Related U.S. Application Data

(60) Provisional application No. 61/098,552, filed on Sep. 19, 2008.

(51) Int. Cl.
*H04N 7/01* (2006.01)
*H04N 11/20* (2006.01)
*H04N 5/46* (2006.01)

(52) U.S. Cl. .................................. 348/445; 348/556
(58) Field of Classification Search .......... 348/553–558, 348/441–459
See application file for complete search history.

(56) References Cited

U.S. PATENT DOCUMENTS
7,212,218 B2 * 5/2007 Suzuki et al. ................. 345/660

OTHER PUBLICATIONS
Wilkinson, Darryl, "*SmX Cinema Solutions New Products*," Retrieved Sep. 16, 2010, http://www.hometheaterdesignmag.com/907smx/, updated Sep. 19, 2007, 5 pages.
"*Aspect Ratio Adjustments—Math*" Retrieved Sep. 16, 2010, http://web.mac.com/piero.fiorani/PieroF_FCE_Effect/Aspect_Ratio_Adjust_Math.html, updated Mar. 28, 2009, 3 pages.

* cited by examiner

*Primary Examiner* — Michael Lee
(74) *Attorney, Agent, or Firm* — Sterne, Kessler, Goldstein & Fox P.L.L.C.

(57) ABSTRACT

The present invention provides a system and method for adjusting aspect ratios. In an embodiment, the present invention adjusts aspect ratios by (1) receiving a desired aspect ratio; (2) determining an adjustment factor based on the original aspect ratio and the desired aspect ratio; and (3) transforming the screen mechanically from the original aspect ratio to a new aspect ratio, where the new aspect ratio is based on the adjustment factor.

21 Claims, 13 Drawing Sheets

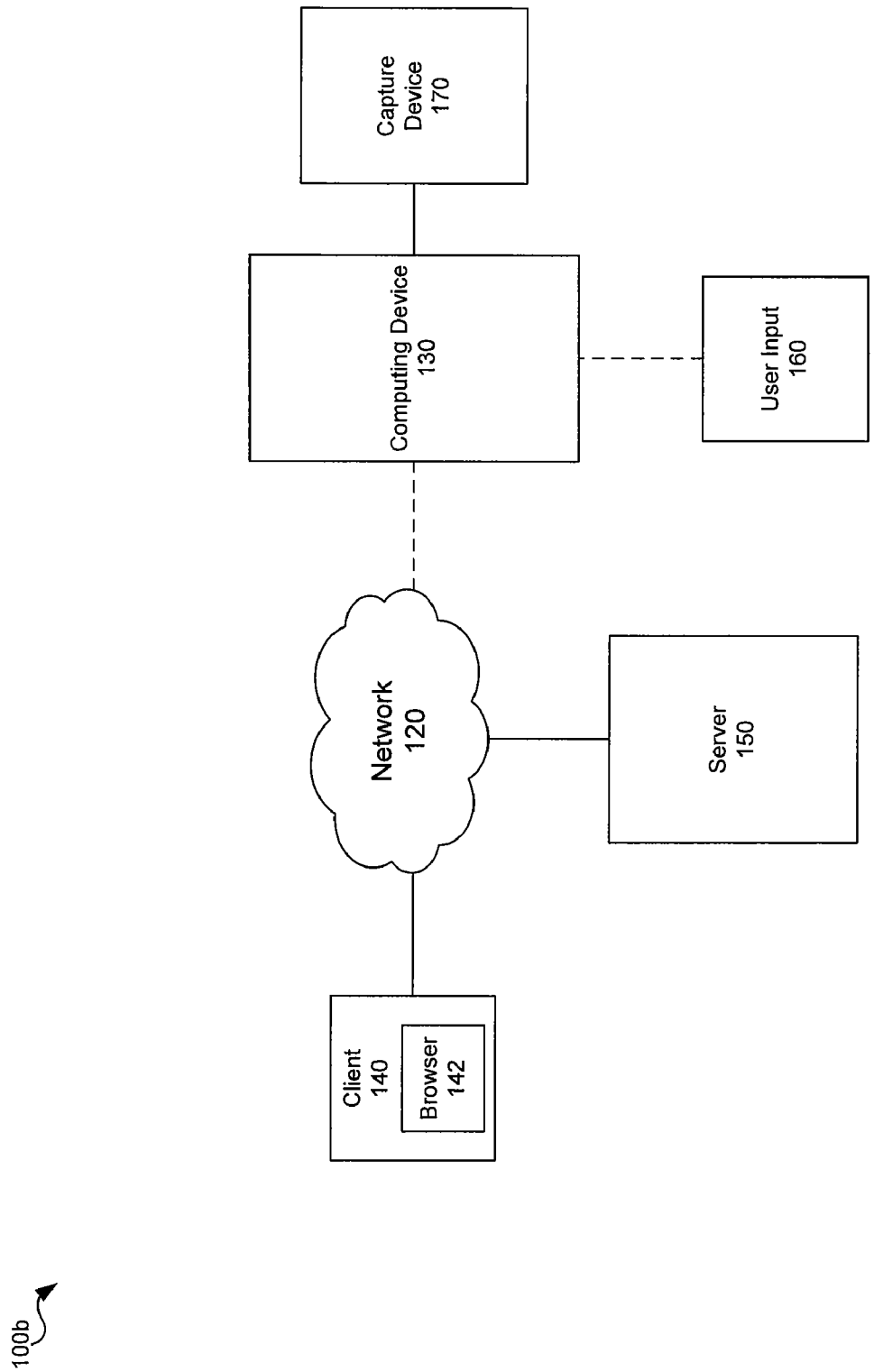

| Common Aspect Ratios | Dual (N=6; Primary AS=2.1) | | Multi-way (N=32; Primary AS=2.35) | | | Continuous (Primary AS=2.35) | | |
|---|---|---|---|---|---|---|---|---|
| | New Aspect Ratio | Wasted Area | New Aspect Ratio | T | Wasted Area | New Aspect Ratio | F | Wasted Area |
| 1.33 | 1.54 | 13.6% | 1.33 | 9 | 6.8% (off) | 1.33 | 0.277 | 7.6% (off) |
| 1.77 | 1.54 | 13.0% | 1.72 | 5 | 1.9% (off) 2.5% (!) | 1.77 | 0.140 | 2.0% (off) |
| 1.85 | 1.54 | 11.9% | 1.84 | 4 | 1.1% (off) 1.0% (!) | 1.85 | 0.120 | 1.4% (off) |
| 2.35 | 1.54 | 10.6% | 2.35 | 0 | 0.0% | 2.35 | 0 | 0.0% |

Table 800

FIG. 8

SYSTEM AND METHOD FOR ADJUSTING ASPECT RATIOS

CROSS REFERENCE TO RELATED APPLICATIONS

This patent application claims the benefit of U.S. Provisional Patent Application No. 61/098,552 filed on Sep. 19, 2008, entitled "System and Method for Adjusting Aspect Ratios," which is incorporated by reference herein in its entirety.

FIELD OF THE INVENTION

The present invention relates to aspect ratios of screens.

BACKGROUND OF THE INVENTION

Displays and capture devices come in many different form factors. A display can be a television, a monitor, a cinema screen, a projector screen, etc. A capture device can be an image sensor in an imaging device, such as a still camera and video camera. The image sensor may be any device that converts an optical image to an electrical signal, e.g., a charge-coupled device (CCD) and a complementary metal-oxide-semiconductor (CMOS) active-pixel sensor. The area on the display or the surface of the capture device may also be called a "screen," and is usually rectangular in shape. For these rectangular screens, the shape of the screen is quantitatively described by its "aspect ratio." An aspect ratio is the ratio of the length of the longer side of the screen to the length of the shorter side of the screen. Common video aspect ratios include 1.33, 1.77, 1.85, and 2.35. Sometimes, however, the screen captures or displays a signal that is of a different aspect ratio. For example, a widescreen movie may be projected onto a standard television set.

A common solution to this mismatch problem is called "letterboxing." The idea is to scale the rectangular signal to fit either the width or the height of the screen. Any spare height or width in the screen is left blank. For example when letterboxing the widescreen movie onto the standard television set, one can see black bands above and below the movie. This solution leaves parts of the screen unused, and the size of the projected or captured signal is unnecessarily diminished.

Another aspect ratio problem relates to the need for photographers and videographers to capture images at different aspect ratios. Currently, for example, a photographer must generally use a separate camera for each aspect ratio, e.g., 3:2 for a standard digital camera, 4:3 for a traditional camera and 4:5 for a large-format camera.

What is needed are techniques that maximize the usable screen area while accommodating signals of different aspect ratios.

BRIEF SUMMARY

This invention relates to adjusting aspect ratios of screens. A system embodiment of this invention adjusts aspect ratios. The system embodiment includes an aspect ratio calculator, an adjustable screen, and a graphics processing unit. The aspect ratio calculator takes an aspect ratio of an incoming signal and computes an adjustment factor for the adjustable screen. The adjustable screen, either through automatic or manual means, is transformed mechanically to a new aspect ratio that is a more suitable match for the incoming signal. The graphics processing unit takes care of determining which pixels in the adjustable screen map to which pixels in the incoming signal and vice-versa.

A method embodiment of this invention adjusts aspect ratios. The method embodiment includes receiving a desired aspect ratio, determining an adjustment factor based on the original aspect ratio and the desired aspect ratio, and transforming the screen mechanically from the original aspect ratio to a new aspect ratio, where the new aspect ratio is based on the adjustment factor.

In this way, the screen area may be better utilized when displaying or capturing images that are of a different aspect ratio than the screen's aspect ratio.

Further embodiments, features, and advantages of the invention, as well as the structure and operation of the various embodiments of the invention are described in detail below with reference to accompanying drawings.

BRIEF DESCRIPTION OF FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 1A-B are architecture diagrams of systems for adjusting aspect ratios according to embodiments of the present invention.

FIG. 8 is an example comparison of results produced by the dual aspect ratio calculator, the multi-way aspect ratio calculator, and the continuously adjustable aspect ratio calculator according to an embodiment of the present invention.

DETAILED DESCRIPTION OF EMBODIMENTS

The present invention relates to adjusting aspect ratios. This can include adjusting aspect ratios for displays and/or capture devices. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe systems and methods for adjusting aspect ratios in greater detail.

System

Figure 1A:
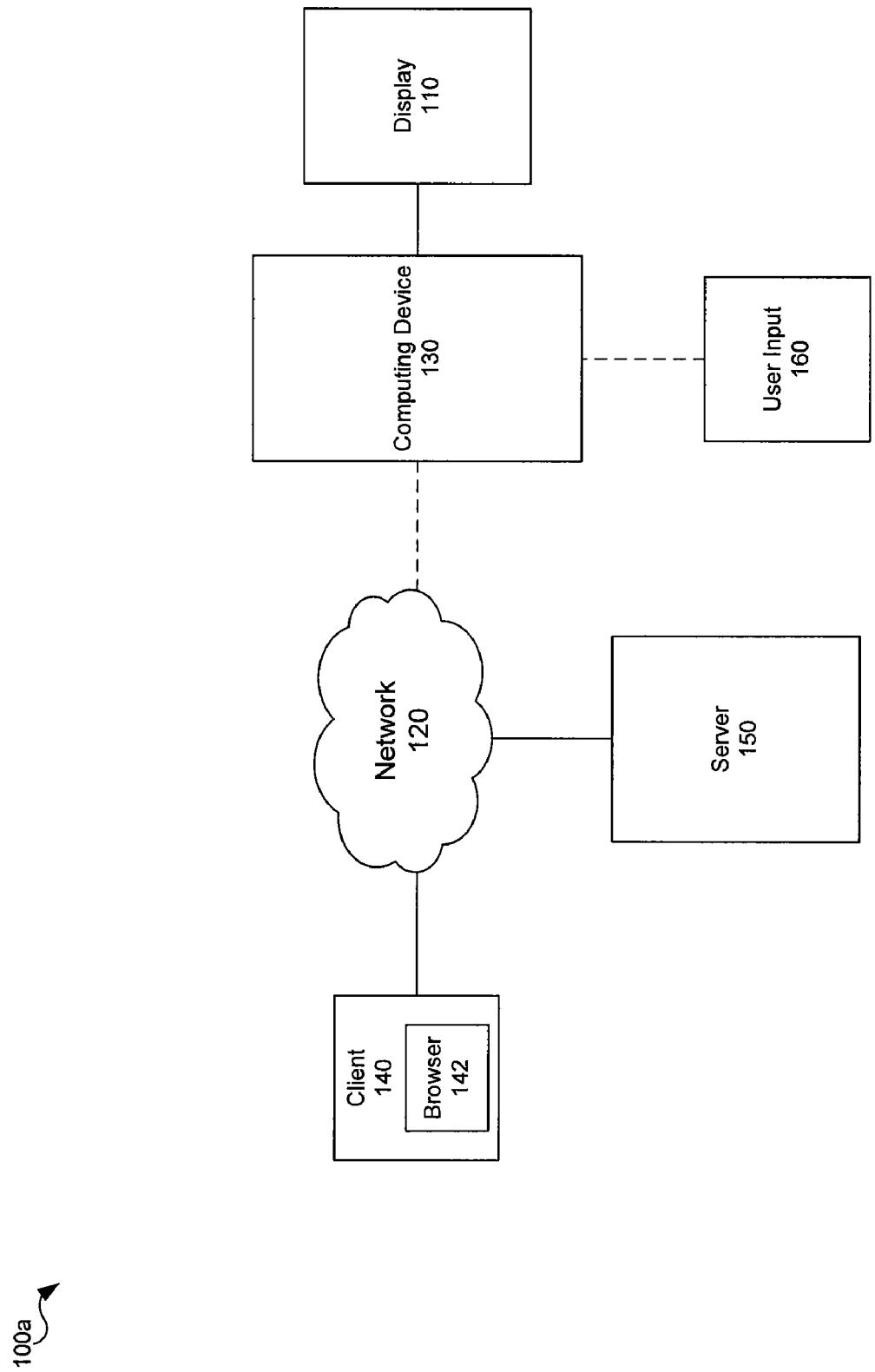

This section describes systems suitable for adjusting aspect ratios. FIGS. 1A-B are architecture diagrams of systems 100a-b for adjusting aspect ratios according to embodiments of the present invention. FIG. 1A shows system 100a. System 100a includes a display 110, a network 120, a computing device 130, a client 140, a server 150, and a user input 160.

Display 110 may be any object capable of displaying a signal, such as an image. For example, not to be limiting, display 110 may be a television, a computer monitor, a projection screen, or a billboard.

Computing device 130 can include, but is not limited to, a personal computer, mobile device such as a mobile phone, workstation, embedded system, game console, television, optical disk player, or set-top box. Computing device 130 may include, but is not limited to, a device having a processor and memory for executing and storing instructions. Computing device 130 may also include software, firmware, hardware, or a combination thereof. Software may include one or more applications and an operating system. Hardware can include, but is not limited to, a processor and memory.

Both client 140 and server 150 may also be implemented on a computing device, such as computing device 130. Client 140 and server 150 may be implemented on one or more computing devices at the same or at different locations. For instance, client 140 and server 150 may be remote from one another on different computing devices coupled to a network, such as network 120. In still another example, server 150 may be implemented on one or more computing devices at a common location and coupled to a remote client 140 over network 120. Other combinations and configuration for arranging client 140 and server 150 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100a depending upon a particular application or environment.

In one embodiment, client 140 includes a browser 142. For example, browser 142 may be a web browser or other type of browser for browsing content. Browser 142 can send a request over network 120 to server 150 and receive a response from server 150. Browser 142 can also send a request over network 120 to computing device 130 and a receive a response from computing device 130. As an example, not to limit the present invention, the request may be a hypertext transfer protocol (HTTP) request. The HTTP request may contain parameters entered by a user using a user interface. The response may be an HTTP response. An HTTP response may contain web content, such as a hypertext markup language (HTML), images, video, or multimedia content. Browser 142 may be implemented as software, hardware, firmware, or any combination thereof.

Server 150 may include a web server or may be coupled to communicate with a web server at the same or a different location. A web server is a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, multimedia features, or any combination thereof. This example is strictly illustrative and does not limit the present invention.

User input 160 may include any device that can provide an interface between computing device 130 and a user. For example, not to be limiting, user input 160 may include a keyboard, a mouse, a microphone, tactile buttons, biometric sensors, or touch screens. In an embodiment, user input 160 converts input provided by the user into electronic control signals recognized by computing device 130.

The dotted lines indicate a connection between the two respective objects is not necessarily required. In a first embodiment, computing device 130 is coupled to display 110 and user input 160. A projector may be an example of a computing device in this embodiment. In a second embodiment, computing device 130 is coupled to display 110 and network 120. An electronic billboard may be an example of a computing device in this embodiment. In a third embodiment, computing device 130 is coupled to display 110, network 120, and user input 160. A workstation with remote desktop capabilities may be an example of a computing device in this embodiment.

FIG. 1B shows system 100b. System 100b includes network 120, computing device 130, client 140, server 150, user input 160, and a capture device 170. Capture device 170 can include, but is not limited to, any device that can capture a signal, such as a still or moving image. For example, capture device 170 may include components of a web camera, a mobile device, such as a mobile phone, a digital camera, a film-based camera, or a video camera that handle the image capturing functionality. Capture device 170 may also include software, firmware, hardware, or a combination thereof. Software may include one or more applications and an operating system. Hardware can include, but is not limited to, a processor, memory, and a graphical user interface display. Note that capture device 170 and computing device 130 may be comprise a single device.

Again, the dotted lines indicate a connection between the two respective objects is not necessarily required. In a first embodiment, computing device 130 is coupled to user input 160 and capture device 170. A digital camera may be an example of a combined computing and capture device in this embodiment. In a second embodiment, computing device 130 is coupled to network 120 and capture device 170. A surveillance camera may be an example of a combined computing and capture device in this embodiment. In a third embodiment, computing device 130 is coupled to network 120, user input 160, and capture device 170. A web camera with remote desktop capabilities may be an example of a combined computing and capture device in this embodiment.

Figure 2A:
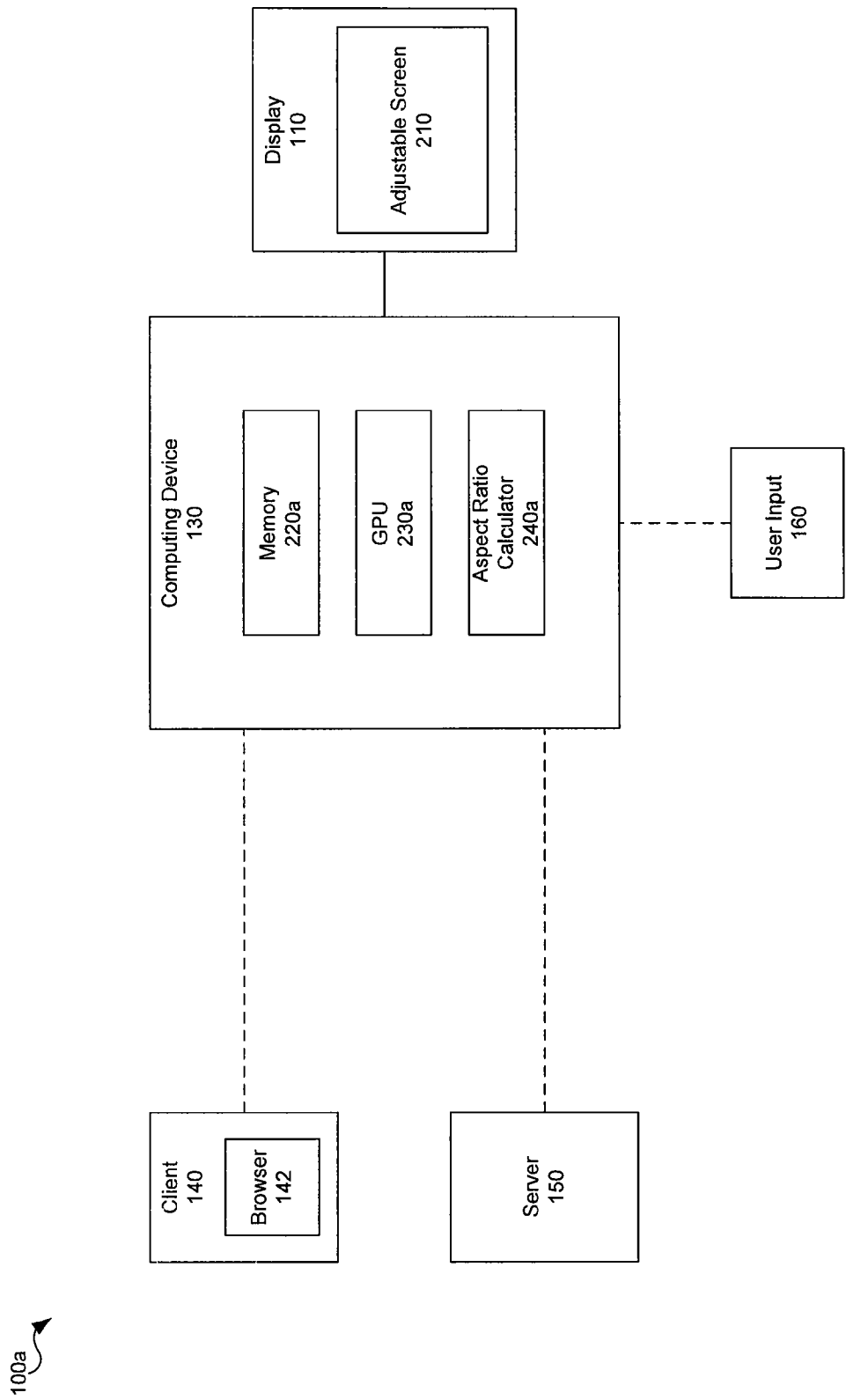
FIGS. 2A-B are more detailed diagrams of systems for adjusting aspect ratios according to embodiments of the present invention.
Figure 2B:
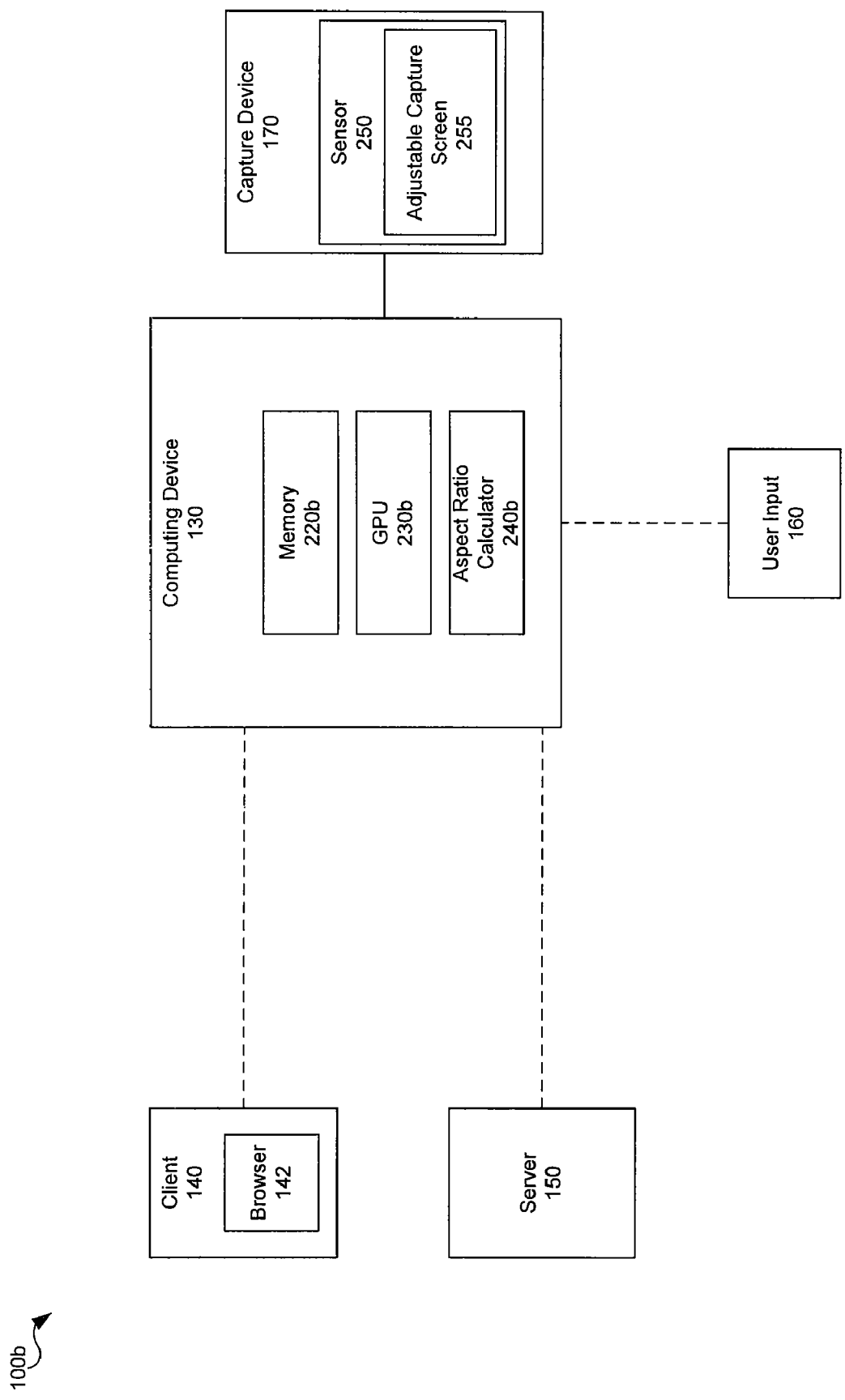

FIGS. 2A-B are more detailed diagrams of systems 100a-b according to embodiments of the present invention. As shown in FIG. 2A, display 110 includes an adjustable screen 210, and computing device 130 includes memory 220a, a graphics processing unit (GPU) 230a, and an aspect ratio calculator 240a.

In an embodiment, adjustable screen 210 is the area of display 110 that displays an image. For example, if display 110 is an LCD monitor, adjustable screen 210 may be the set of pixels used to display an image. The aspect ratio of display 110 is defined by the ratio of the width of adjustable screen 210 to its height. In an embodiment, this ratio is adjustable by mechanically altering the width and/or height. Examples of ways adjustable screen 210 may be altered are presented below with respect to FIGS. 3A, 4-6, and 8.

Memory 220*a* may be any type of physical memory capable of storing instructions and/or data, such as, for example, random access memory (RAM) and read-only memory (ROM).

GPU 230*a* is a graphics rendering unit that renders the image eventually shown on adjustable screen 210. As an example, GPU 230*a* may determine how to map the pixels of the image to the pixels of adjustable screen 210. In an embodiment, GPU 230*a* is a standalone module. In an alternate embodiment, not shown, GPU 230*a* is part of a CPU or integrated into a motherboard.

In an embodiment, aspect ratio calculator 240*a* calculates an aspect ratio for adjustable screen 210. As is described herein, the aspect ratio is the ratio of the length of the longer side of a rectangular screen to the length of the smaller side of the rectangular screen. The aspect ratio may be based on a current aspect ratio as well as a desired aspect ratio indicated by client 140, server 150, user input 160, and/or data stored in memory 220*a*. Aspect ratio calculator 240*a* is described in greater detail below with respect to FIGS. 3A-6.

As shown in FIG. 2B, computing device 130 includes memory 220*b*, GPU 230*b*, and aspect ratio calculator 240*b*, and capture device 170 includes a sensor 250. In an embodiment, memory 220*b* has the same characteristics as memory 220*a* of system 100*a*, and aspect ratio calculator 240*b* has the same characteristics as aspect ratio calculator 240*a* of system 100*a*. GPU 230*b* may be similar to GPU 230*a* of system 100*a*; however GPU 230*b* may convert a captured image into an image that can be stored in memory 220*b*. As an example, GPU 230*b* may determine how to map the pixels of a captured image to the pixels of a raw image that is stored in memory 220*b*. Sensor 250 may be any known medium capable of capturing an image. In a first example, sensor 250 may be an image sensor, such as, for example, a charge-coupled device (CCD) chip or a CMOS sensor, used to capture images in digital cameras, optical scanners, and the like. In a second example, sensor 250 may be photographic film.

In an embodiment, sensor 250 includes an adjustable capture screen 255. Adjustable capture screen 255 includes the area of sensor 250 used to capture an image. For example, if sensor 250 is a CCD chip, adjustable capture screen 255 may be the grids of pixels used by the CCD chip to sense light. Adjustable capture screen 255 can also be an optical apparatus used to reflect light onto sensor 250, such as, for example, if sensor 250 is a reflection-based projection chip.

The aspect ratio of sensor 250 is defined by the ratio of the larger of the width and height of adjustable capture screen 255 to the lesser of its width and height. In an embodiment, this ratio is adjustable by mechanically altering the width and/or height of adjustable capture screen 255. This may involve moving pixels or altering the area of light reflected onto sensor 250. Examples of ways adjustable capture screen 255 may be altered are presented below with respect to FIGS. 3B and 4-6.

Figure 3A:
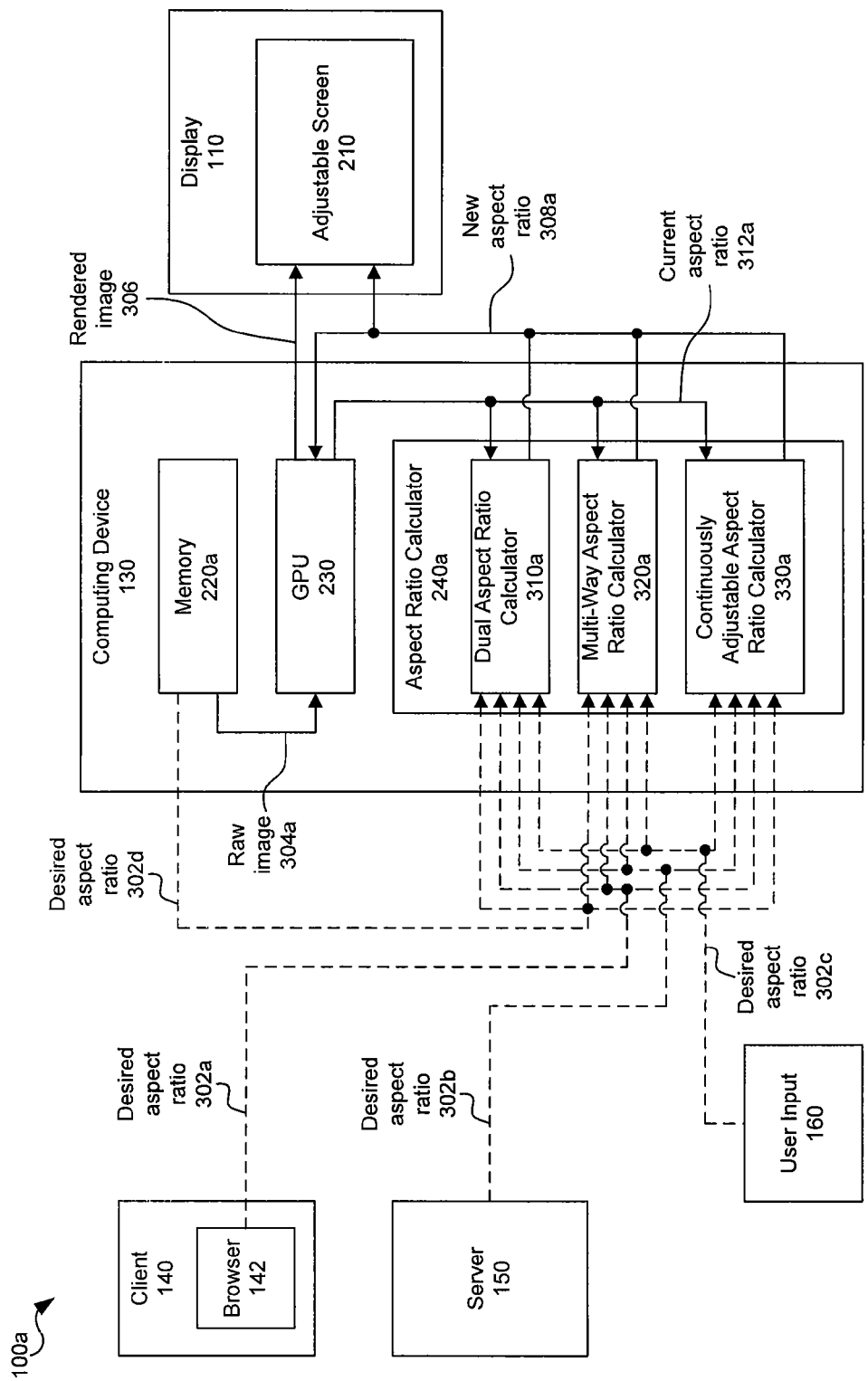
FIGS. 3A-B are diagrams that display how components of systems for adjusting aspect ratios may interoperate according to embodiments of the present invention.
Figure 3B:
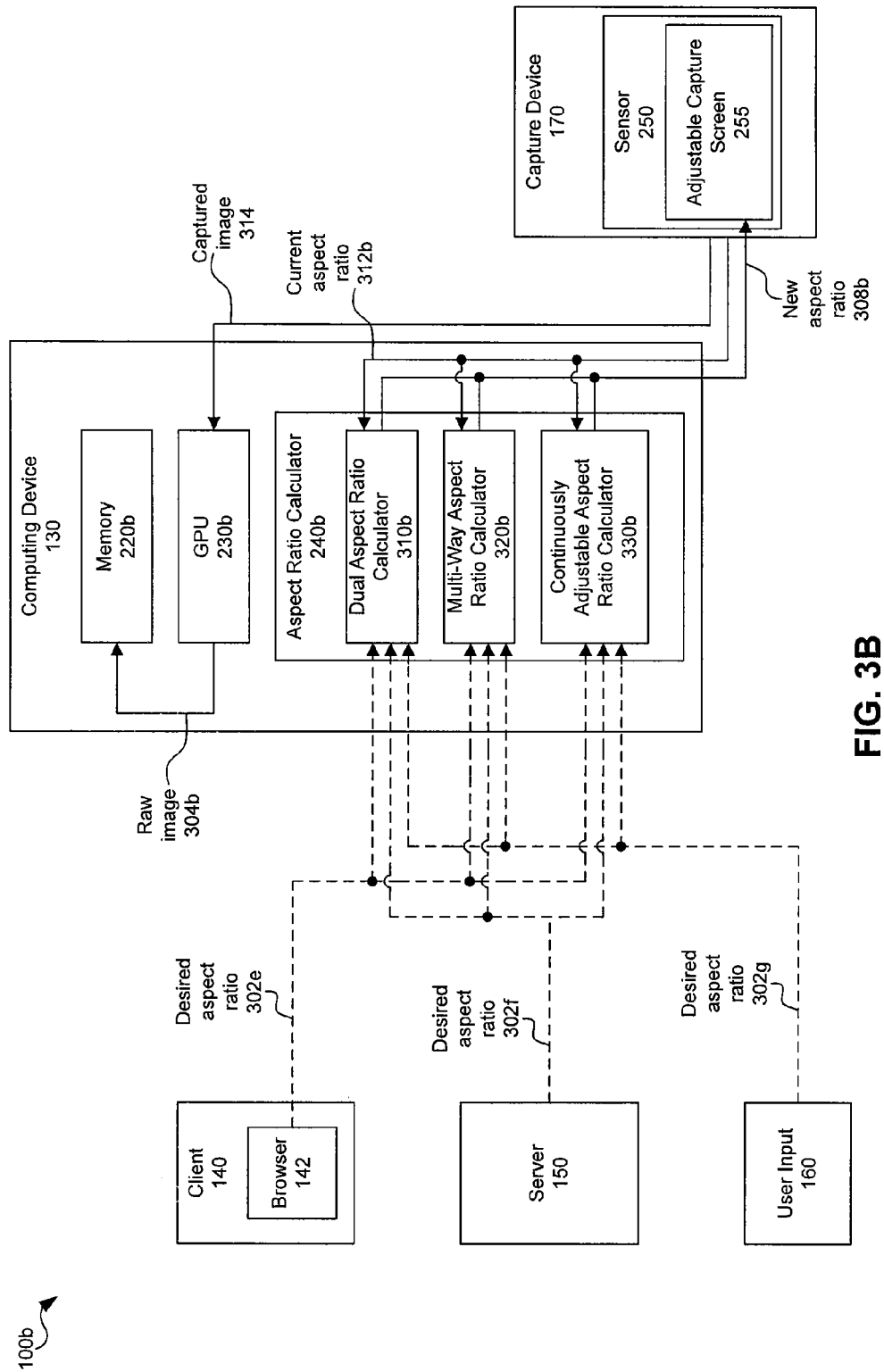

FIGS. 3A-B are diagrams that display how components of systems 100*a*-*b* may interoperate according to embodiments of the present invention. As shown in FIG. 3A, aspect ratio calculator 240*a* includes a dual aspect ratio calculator 310*a*, a multi-way aspect ratio calculator 320*a*, and a continuously adjustable aspect ratio calculator 330*a*.

In an embodiment, browser 142, server 150, user input 160, and/or memory 220*a* send desired aspect ratios 302*a*-*d* to dual aspect ratio calculator 310*a*, multi-way aspect ratio calculator 320*a*, and/or continuously adjustable aspect ratio calculator 330*a*. Desired aspect ratios 302*a*-*d* is a numerical value representing an aspect ratio at which it is desired display 110 display an image. In an embodiment, desired aspect ratios 302*a*-*d* represent the aspect ratio of the image that is to be displayed by display 110. Desired aspect ratios 302*a*-*d* may be different than an aspect ratio that is currently used by display 110. Note that while aspect ratio calculator 240*a* may receive all desired aspect ratios 302*a*-*d*, a single desired aspect ratio 302*a*-*d* is used when performing its calculations.

Desired aspect ratio 302*d*, which originates from memory 220*a*, may be the aspect ratio of raw image 304*a*, which is passed from memory 220*a* to GPU 230*a*. GPU 230*a* renders raw image 304*a* to produce rendered image 306, which is sent to adjustable screen 210 to be displayed. As is described below, the aspect ratio represented by one of desired aspect ratio 302*a*-*d* is not necessarily the final aspect ratio of adjustable screen 210.

While aspect ratio calculator 240*a* may include dual aspect ratio calculator 310*a*, multi-way aspect ratio calculator 320*a*, and continuously adjustable aspect ratio calculator 330*a*, only one calculator is used at a time. The chosen calculator may depend on a number of factors, including, but not limited to, the structure of display 110, the capabilities of GPU 230*a*, how closely the calculated aspect ratio, new aspect ratio 308*a*, matches desired aspect ratio 302*a*-*d*, and the aspect ratio of raw image 304*a*. For example, as is described in greater detail below, display 110 may be of a specific design that only allows adjustable screen 210 to be mechanically moved in certain ways. The motions allowed may restrict aspect ratio calculator 240*a* from using one of its calculators. The examples are described in greater detail below. Aspect ratio calculator 240*a* may run one or more of the three calculators at a same or different time and compare their results in order to determine which one to choose.

Note that the following description does not focus on the electronics or software that may be needed to reorganize rendered image 306 such that rendered image 306 is properly displayed by display 110. GPU 230*a* may be a component in computing device 130 that performs this reorganization. Thus, aspect ratio calculator 240*a* may be limited based on any limitations GPU 230*a* may have with regards to reorganizing images to be displayed at different aspect ratios.

Dual aspect ratio calculator 310*a* implements an algorithm that determines how two halves of adjustable screen 210 may be mechanically realigned. In an embodiment, adjustable screen 210 may be separated into two halves in many different ways. In this case, dual aspect ratio calculator 310*a* may determine first how the two halves are to be separated before determining how to mechanically move each half. In an alternate embodiment, adjustable screen 210 is precut into two halves. For example, adjustable screen 210 may have been precut during manufacturing of display 110. In this case, dual aspect ratio calculator 310*a* only determines how to mechanically move each half. As described herein, it is assumed adjustable screen 210 may be separated into two halves in many different ways.

Figure 4:
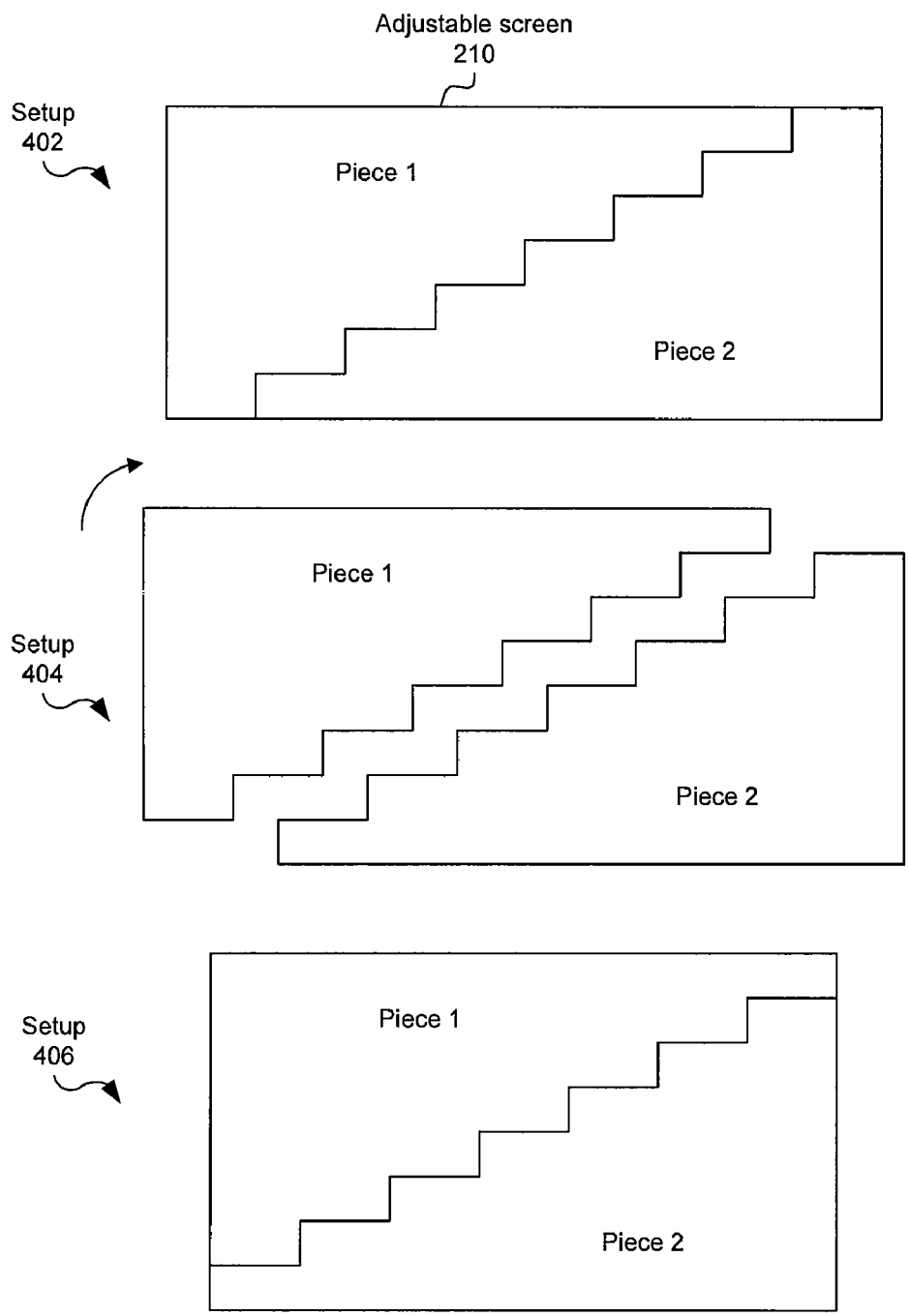
FIG. 4 is a visual example of an algorithm employed by a dual aspect ratio calculator according to an embodiment of the present invention.

FIG. 4 is a visual example of the algorithm employed by dual aspect ratio calculator 310*a* according to an embodiment of the present invention. As shown in FIG. 4, adjustable screen 210 is divided by a staircase cut along its diagonal. Setup 402 is called a primary screen. In this example, the primary screen has a height of seven units and a width of 16 units. The aspect ratio of setup 402 is then 16 divided by seven, or approximately 2.29.

Dual aspect ratio calculator 310*a* chooses a value for a variable N, in this example seven, where variable N controls how many vertical and horizontal segments make up the staircase cut. Variable N may also be known as an adjustment factor. In an embodiment, the staircase cut has N vertical segments and N+1 horizontal segments. Once N has been determined, adjustable screen 210 can be physically broken into two parts, piece one and piece two, along the staircase cut, as shown in setup 404. Piece one may be moved one step up on piece two. This creates a secondary screen of width fourteen and height eight, as shown in setup 406. The new aspect ratio of adjustable screen 210 is then fourteen divided by eight, or 1.75. Under the algorithm implemented by dual aspect ratio calculator 310a, adjustable screen 210 can display images at one of two aspect ratios: its original aspect ratio, such as the aspect ratio in setup 402, and new aspect ratio 308a, such as the aspect ratio in setup 406. Note that this particular setup for adjustable screen 210 will accommodate images having aspect ratios of 1.75 or 2.29 with no waste. However, if adjustable screen 210 receives an image having an aspect ratio of 2.2, then computing device 130 may choose to render the image in the 2.29 aspect ratio configuration since that minimizes the space wasted due to letterboxing. Calculations to determine unused space of adjustable screen 210 are described below.

In general, dual aspect ratio calculator 310a takes a current aspect ratio 312a from adjustable screen 210, where current aspect ratio 312a includes the width and the height of adjustable screen 210, and calculates new aspect ratio 308a, such that adjustable screen 210 can be transformed into a secondary screen with an aspect ratio of new aspect ratio 308a. The second screen has a width of (W*N)/(N+1) and a height of (N+1)*H/N, where N is an integer greater than zero. Another way to state this is that if current aspect ratio 312a is X, and an N-way staircase cut is made along the diagonal of adjustable screen 210, then new aspect ratio 308a will be a maximum of the following two expressions:

$$\frac{(N+1)^2}{X*N^2} \quad (1)$$

$$\frac{X*N^2}{(N+1)^2} \quad (2)$$

Note that transforming adjustable screen 210 may involve a 90 degree rotation. This rotation is described below with respect to FIGS. 5A-B.

Note also that it may be desirable for dual aspect ratio calculator 310a to choose an N such that new aspect ratio 308a is as close to desired aspect ratio 302a-d as possible. As an example, the following table lists values of N that result in new aspect ratios 308a that most closely match desired aspect ratios 302a-d:

TABLE 1

| 1.33 | | | |
| 1.77 | N = 7; ~1.36 | | |
| 1.85 | N = 6; ~1.36 | N = 50; ~1.78 | |
| 2.35 | N = 3; ~1.32 | N = 7; ~1.80 | N = 8; ~1.85 |
| | 1.33 | 1.77 | 1.85 | 2.35 | where the left-most column lists current aspect ratios 312a, the bottom-most row lists desired aspect ratios 302a-d, and new aspect ratios 308a are listed following the chosen value for N. These current aspect ratios 312a and desired aspect ratios 302a-d are aspect ratios of some of the more popular video formats. In an embodiment, if a manufacturer of a display wishes that the display support two particular aspect ratios, then the manufacturer may choose a value of N that best matches the two desired aspect ratios using Expressions (1) and (2).

Multi-way aspect ratio calculator 320a also implements an algorithm that determines how two halves of adjustable screen 210 may be mechanically realigned. In an embodiment, multi-way aspect ratio calculator 320a implements an algorithm that is an extension of the algorithm implemented by dual aspect ratio calculator 310a. Unlike in the algorithm implemented by dual aspect ratio calculator 310a, the algorithm implemented by multi-way aspect ratio calculator 320a allows adjustable screen 210 to transform into N configurations, each configuration having a different aspect ratio, for any given N.

Figure 5A:
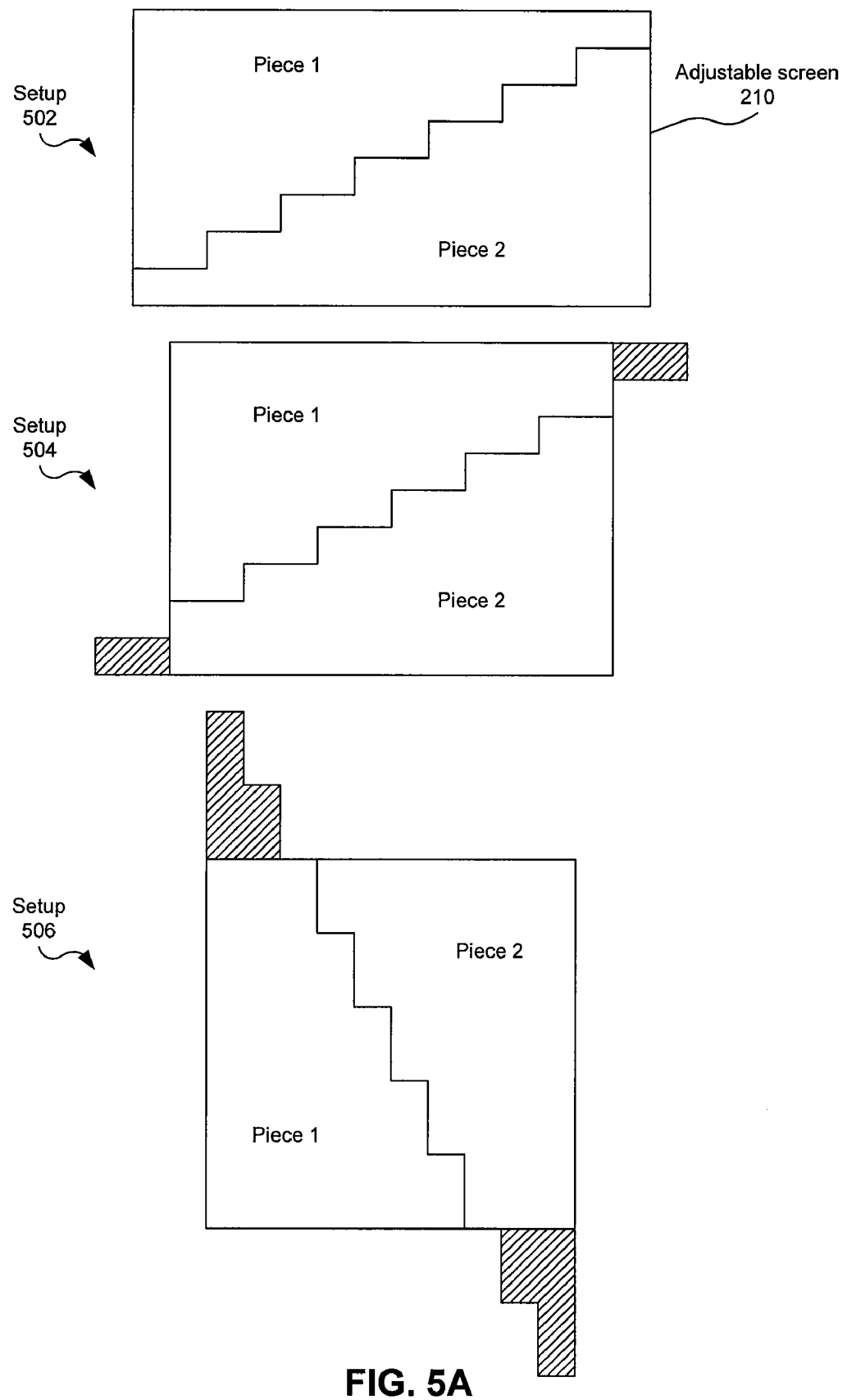
FIGS. 5A-B are visual examples of an algorithm employed by a multi-way aspect ratio calculator according to an embodiment of the present invention.
Figure 5B:
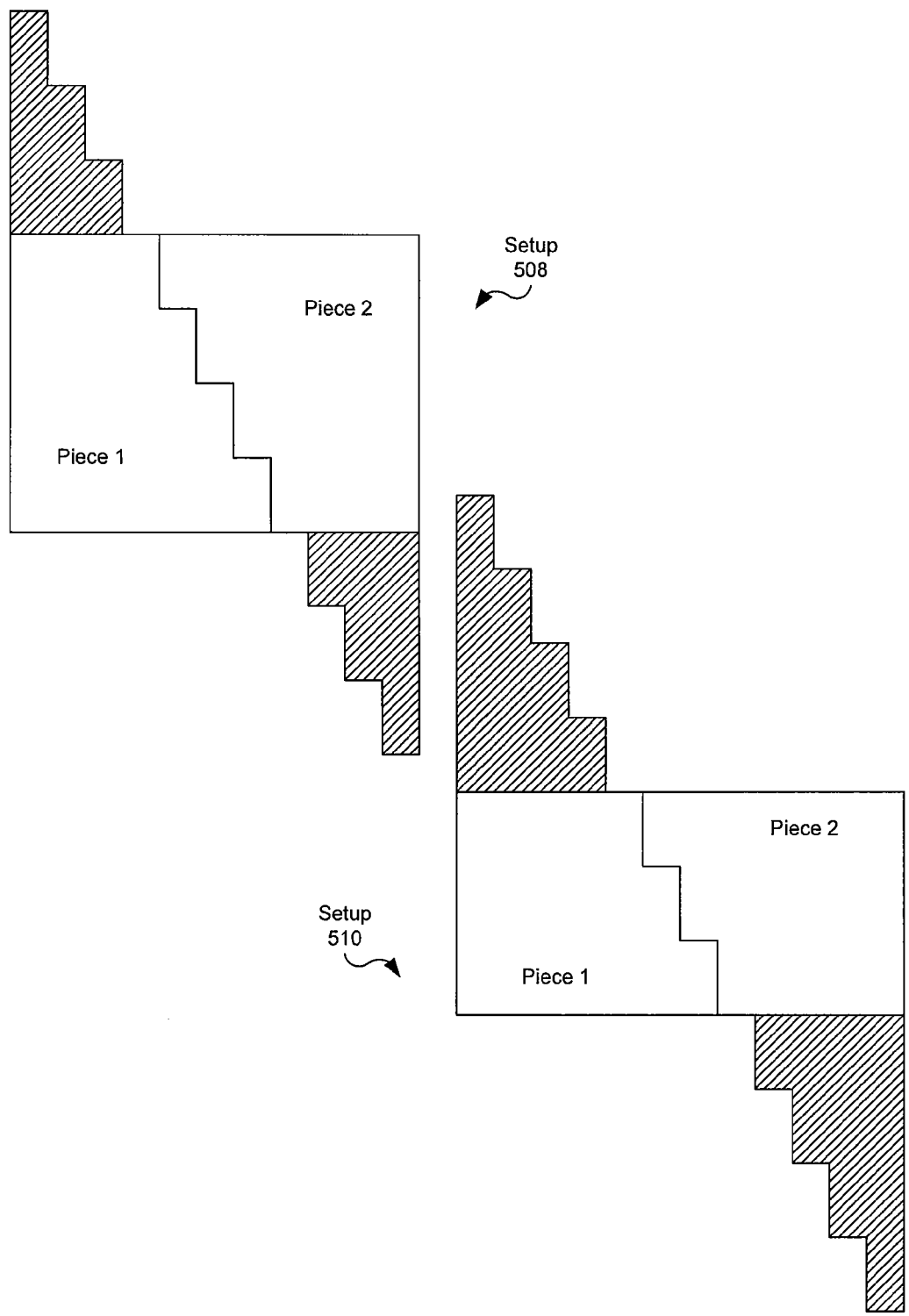

FIGS. 5A-B are visual examples of the algorithm employed by multi-way aspect ratio calculator 320a according to an embodiment of the present invention. As shown in FIGS. 5A-B, adjustable screen 210 is again divided by a staircase cut along its diagonal, with N being seven. Adjustable screen 210 then may transform from setup 402 of FIG. 4 to any of setups 502, 504, 506, 508, and 510. Setup 502 is a first secondary screen with a width of fourteen and a height of eight, leading to an aspect ratio of 1.75. Setup 504 is a second secondary screen with a width of twelve and a height of nine, leading to an aspect ratio of 1.33. Setup 506 is a third secondary screen with a width of ten and a height of ten, leading to an aspect ratio of 1. Setup 508 is a fourth secondary screen with a width of eleven and a height of eight, leading to an aspect ratio of 1.38. And finally, setup 510 is a fifth secondary screen with a width of twelve and a height of six, leading to an aspect ratio of 2.

Note that two more configurations are possible in this example by following the pattern until piece one and piece two no longer share an edge. Here, setups 506, 508, and 510 have been rotated 90 degrees. This rotation may depend on the aspect ratio and orientation of rendered image 306, or may depend on ensuring the width to height ratio of adjustable screen 210 is equal to or above one. The shaded area in setups 504, 506, 508, and 510 represents the area of adjustable screen 210 that will not be used to display rendered image 306.

Multi-way aspect ratio calculator 320a chooses a value for a variable N, in this example seven, where variable N controls how many vertical and horizontal segments make up the staircase cut. In an embodiment, the staircase cut has N vertical segments and N+1 horizontal segments. Once N has been determined, adjustable screen 210 can be physically broken into two parts, piece one and piece two, along the staircase cut, as shown in setup 404 of FIG. 4. Piece one may be moved one or more steps up on piece two. This creates one of many possible secondary screens. The number of steps piece one is moved, represented by a variable T, may be dependent on desired aspect ratio 302a-d and is appropriately chosen by multi-way aspect ratio calculator 320a.

In general, multi-way aspect ratio calculator 320a takes current aspect ratio 312a from adjustable screen 210 and calculates new aspect ratio 308a, such that adjustable screen 210 can be transformed into a secondary screen with an aspect ratio of new aspect ratio 308a. New aspect ratio 308a, according to multi-way aspect ratio calculator 320a, is represented by the following equation:

$$X(T) = \max\left\{\frac{(N+T)(N+1)}{N*X(N-T+1)}, \frac{N*X(N-T+1)}{(N+T)(N+1)}\right\} \quad (3)$$

where N is an integer greater than zero, T goes from zero to N and represents the number of steps piece one moves up on piece two, and X is the aspect ratio of adjustable screen 210.

Like variable N, variable T may also be known as an adjustment factor. In an embodiment, multi-way aspect ratio calculator 320a chooses a T that minimizes the amount of letterboxed space in adjustable screen 210.

Like dual aspect ratio calculator 310a and multi-way aspect ratio calculator 320a, continuously adjustable aspect ratio calculator 330a also implements an algorithm that determines how two halves of adjustable screen 210 may be mechanically realigned. However, in an embodiment, unlike the first two calculators described above, continuously adjustable aspect ratio calculator 330a does not calculate new aspect ratio 308a for adjustable screens 210 that have a staircase cut along their diagonal. Instead, continuously adjustable aspect ratio calculator 330a calculates new aspect ratio 308a for those adjustable screens 210 that have a linear cut along their diagonal. Since there is no staircase cut, continuously adjustable aspect ratio calculator 330a does not need to determine a value for a variable N.

Figure 6:
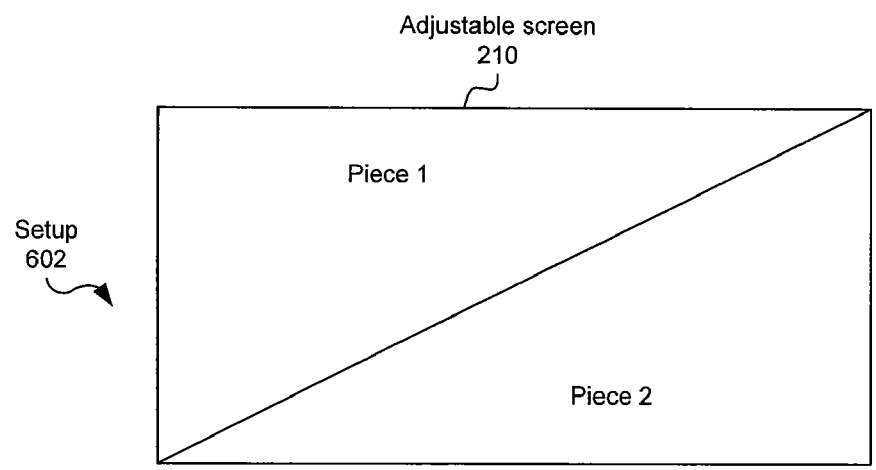
FIG. 6 is a visual example of an algorithm employed by a continuously adjustable aspect ratio calculator according to an embodiment of the present invention.
Figure 6:
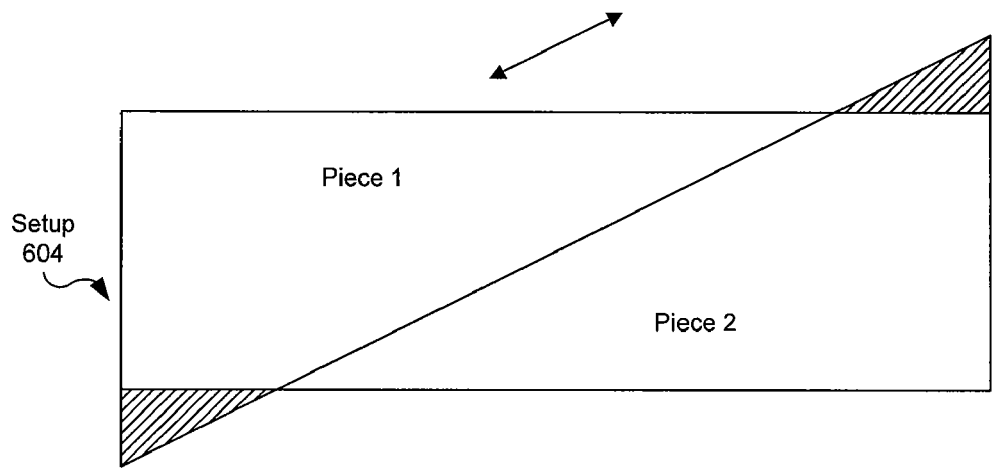

FIG. 6 is a visual example of the algorithm employed by continuously adjustable aspect ratio calculator 330a according to an embodiment of the present invention. As shown in FIG. 6, adjustable screen 210 is split into two halves, piece one and piece two. Setup 602 is the primary screen and setup 604 is a secondary screen. Piece one may slide diagonally left or diagonally right along the diagonal cut to the extent that it still shares an edge with piece two, creating a continuous range of achievable aspect ratios. Again, the shaded area in setup 604 is an area of adjustable screen 210 that will not be used to display rendered image 306.

In general, continuously adjustable aspect ratio calculator 330a takes current aspect ratio 312a from adjustable screen 210 and calculates new aspect ratio 308a, such that adjustable screen 210 can be transformed into a secondary screen with an aspect ratio of new aspect ratio 308a. New aspect ratio 308a, according to continuously adjustable aspect ratio calculator 330a, is represented by the following equation:

$$X(F) = \max\left\{\frac{X(1-F)}{(1+F)}, \frac{(1+F)}{X(1-F)}\right\} \tag{4}$$

where F ranges from zero to one and represents a fraction of the vertical of adjustable screen 210 that is off the viewable area, and X is the aspect ratio of adjustable screen 210. Variable F may be considered an adjustment factor.

In an embodiment, continuously adjustable aspect ratio calculator 330a chooses an F, such that new aspect ratio 308a equals desired aspect ratio 302a-d. In an alternate embodiment, continuously adjustable aspect ratio calculator 330a chooses an F where new aspect ratio 308a does not equal desired aspect ratio 302a-d, which results in letterboxing in the viewable area of adjustable screen 210.

In an embodiment, new aspect ratio 308a may be used by display 110 in order to instruct a user how to mechanically alter adjustable screen 210 to achieve new aspect ratio 308a. In another embodiment, adjustable screen 210 may automatically adjust itself upon receiving new aspect ratio 308a. In an alternate embodiment, not shown, adjustable screen 210 may automatically adjust itself upon receiving both new aspect ratio 308a and input from the user, such as through user input 160.

As mentioned above, aspect ratio calculator 240a may choose one of its three calculators based on the best fit. In other words, aspect ratio calculator 240a may choose a calculator based on which of its calculators results in the least amount of screen space wasted. In an embodiment, in order to determine which calculator results in the least amount of screen space wasted, aspect ratio calculator 240a may compute the percentage area of adjustable screen 210 that has to be letterboxed. This letterboxing may occur if new aspect ratio 308a does not exactly match the aspect ratio of rendered image 306. The letterboxing results in black vertical or horizontal bands surrounding one or more sides of rendered image 306. As described herein, it is assumed that the aspect ratio of rendered image 306 is desired aspect ratio 302a-d.

Dual aspect ratio calculator 310a may calculate the percentage of adjustable screen 210 that is letterboxed according to the following equation:

$$\text{letterbox } \% = 100 - 100 * \min\left(\frac{X}{Y}, \frac{Y}{X}\right) \tag{5}$$

where X is the aspect ratio of adjustable screen 210 and Y is the aspect ratio of rendered image 306.

Multi-way aspect ratio calculator 320a may result in wasted area due both to letterboxing and the shaded areas, as shown in FIGS. 5A-B. Multi-way aspect ratio calculator 320a may calculate the percentage of adjustable screen 210 that is letterboxed according to Equation (5). Multi-way aspect ratio calculator 320a may calculate the percentage of adjustable screen 210 that is in a shaded area according to the following equation:

$$\text{shaded } \% = \left(\frac{100 * T * (T-1)}{N * (N+1)}\right) \tag{6}$$

where T represents the number of steps piece one moves up on piece two.

Continuously adjustable aspect ratio calculator 330a may also result in wasted area due to both letterboxing and the shaded areas, as shown in FIG. 6. Continuously adjustable aspect ratio calculator 330a may calculate the percentage of adjustable screen 210 that is unused according to the following equation:

$$\text{shaded + letterboxed } \% = 100 - 100 * \min\left(\frac{X}{Y}, \frac{Y}{X}\right) * (1 - F^2) \tag{7}$$

where X is the aspect ratio of adjustable screen 210, Y is the aspect ratio of rendered image 306, and F represents a fraction of the vertical of adjustable screen 210 that is off the viewable area.

FIG. 3B shows how components of system 100b may interoperate. As shown in FIG. 3B, aspect ratio calculator 240b includes dual aspect ratio calculator 310b, multi-way aspect ratio calculator 320b, and continuously adjustable aspect ratio calculator 330b. In an embodiment, dual aspect ratio calculator 310b, multi-way aspect ratio calculator 320b, and continuously adjustable aspect ratio calculator 330b have the same characteristics as their respective counterparts in system 100a.

Browser 142, server 150, and user input 160 send desired aspect ratios 302e-g to dual aspect ratio calculator 310b, multi-way aspect ratio calculator 320b, and continuously adjustable aspect ratio calculator 330b. In an embodiment, desired aspect ratios 302e-g represent the desired aspect ratio of the image or video that is to be captured by sensor 250. As an example, not to be limiting, a user may wish to take a panoramic picture or a portrait picture, and desired aspect ratios 302*e-g* represent the appropriate aspect ratio to enable the user to take such a picture. Adjustable capture screen 255 sends its current aspect ratio, current aspect ratio 312*b*, to dual aspect ratio calculator 310*b*, multi-way aspect ratio calculator 302*b*, and continuously adjustable aspect ratio calculator 330*b* as well. Like adjustable screen 210, adjustable capture screen 255 may have size and/or transformation limitations that may influence aspect ratio calculator 240*b* in deciding which calculator to choose. A new aspect ratio 308*b* originates from the chosen calculator and is sent to adjustable capture screen 255.

In an embodiment, capture device 170 may instruct a user how to mechanically alter adjustable capture screen 255 upon receiving new aspect ratio 308*b*. In another embodiment, adjustable capture screen 255 may automatically adjust itself upon receiving new aspect ratio 308*b*. In an alternate embodiment, not shown, adjustable capture screen 255 may automatically adjust itself upon receiving both new aspect ratio 308*b* and input from the user, such as through user input 160.

When sensor 250 is set to capture data, adjustable capture screen 255 begins the capturing process, and sensor 250 sends a captured image 314 to GPU 230*b*. GPU 230*b* converts captured image 314 into a raw image 304*b*, and GPU 230*b* sends raw image 304*b* to memory 220*b* for storage. In an embodiment, sensor 250 may temporarily suspend data capture while adjustable capture screen 255 is altered, and resume data capture at new aspect ratio 308*b* once the transformation of adjustable capture screen 255 is complete.

In this way, an aspect ratio of a screen can be mechanically adjusted to maximize the area of the screen used to display an image or to maximize the area of the screen used to capture an image. Note that the techniques described above can also be used in a general way to change the aspect ratio of any rectangular surface.

Method

Figure 7:
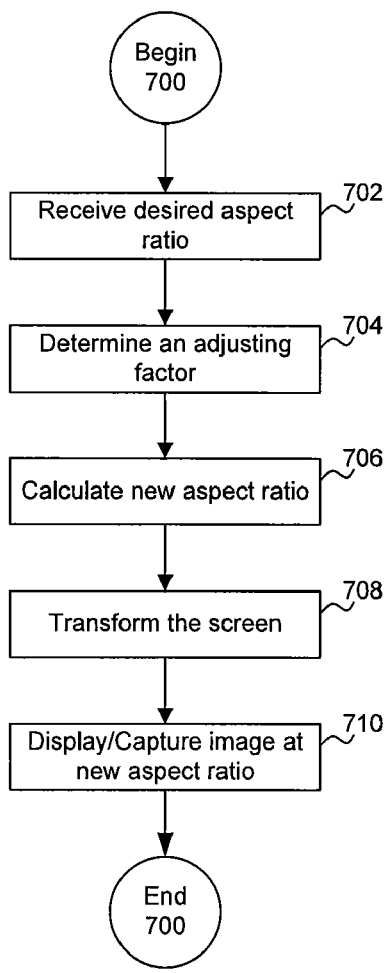
FIG. 7 is a flowchart of a method for adjusting aspect ratios according to an embodiment of the present invention.

This section describes a method used for adjusting aspect ratios. FIG. 7 is a flowchart of a method 700 for adjusting an aspect ratio according to an embodiment of the present invention. While method 700 is described with respect to an embodiment of the present invention, method 700 is not meant to be limited and may be used in other applications. In an example, method 700 may be adjust an aspect ratio of a screen, such as adjustable screen 210 of FIG. 2A or adjustable capture screen 255 of FIG. 2B. However, method 700 is not meant to be limited to adjustable screen 210 or adjustable capture screen 255.

As shown in FIG. 7, method 700 begins at stage 702 where a desired aspect ratio is received. In an embodiment, one of a dual aspect ratio calculator, a multi-way aspect ratio calculator, and a continuously adjustable aspect ratio calculator is chosen to receive the desired aspect ratio. The chosen calculator may be selected based on characteristics of a display that displays an image or of a sensor chip that captures an image. As an example, a screen of the display or sensor chip may be precut, in a staircase or linear design, along its diagonal. In an embodiment, the dual aspect ratio calculator or the multi-way aspect ratio calculator may be chosen if in a staircase design, while the continuously adjustable aspect ratio calculator may be chosen if in a linear design. The chosen calculator may also be selected based on its ability to generate an aspect ratio that closely matches an aspect ratio of an image to be displayed or a wanted aspect ratio for an image to be captured. Once stage 702 is complete, method 700 proceeds to stage 704.

At stage 704, an adjustment factor is determined. In an embodiment, the chosen calculator determines the adjustment factor. If the chosen calculator is the dual aspect ratio calculator, in cases where the screen has not been precut, the adjustment factor may be used to determine how to partition the screen. In those where the display is precut, the dual aspect ratio calculator determines the adjustment factor based on the number of horizontal and/or vertical segments. The adjustment factor may be equivalent to variable N, described above with respect to FIG. 3A. If the chosen calculator is the multi-way aspect ratio calculator, two adjustment factors may be determined. The first adjustment factor may be equivalent to the adjustment factor found by the dual aspect ratio calculator. The second adjustment factor may be determined based on how far a first half of the screen is to be moved in relation to a second half of the screen in order to achieve the wanted aspect ratio. The second adjustment factor may be equivalent to variable T, described above with respect to FIG. 3A. If the chosen calculator is the continuously adjustable, the adjustment factor may be used to determine how far to move the first half of the screen in relation to the second half of the screen. The adjustment factor in this case may be equivalent to variable F, described above with respect to FIG. 3A. Once stage 704 is complete, method 700 continues to stage 706.

At stage 706, a new aspect ratio is calculated. In an embodiment, the new aspect ratio is calculated by the chosen calculator. If the dual aspect ratio calculator is chosen, the new aspect ratio may be calculated according to a ratio of Expressions (1) and (2). If the multi-way aspect ratio calculator is chosen, the new aspect ratio may be calculated according to Equation (3). If the continuously adjustable aspect ratio calculator is chosen, the new aspect ratio may be calculated according to Equation (4). Once stage 706 is complete, method 700 proceeds to stage 708.

At stage 708, the screen is mechanically transformed from its original aspect ratio to the new aspect ratio. In an embodiment, the screen is manually altered by a user. In another embodiment, the screen is automatically transformed upon receiving the new aspect ratio. In an alternate embodiment, the screen is automatically transformed upon receiving the new aspect ratio and input from the user. Once stage 708 is complete, method 700 continues to stage 710.

At stage 710, an image is displayed or captured at the new aspect ratio. In an embodiment, when the screen displays an image, a portion of a computing device, such as a graphics processing unit, may determine how to properly map the pixels of the image to the pixels on the screen. Once stage 710 is complete, method 700 ends.

Examples

FIG. 8 is an example comparison of results produced by dual aspect ratio calculators 310*a-b*, multi-way aspect ratio calculators 320*a-b*, and continuously adjustable aspect ratio calculators 330*a-b* of FIGS. 3A-B according to an embodiment of the present invention. As shown in FIG. 8, table 800 lists some common aspect ratios as desired aspect ratios. These aspect ratios include 1.33, which is used for standard definition (SD) television programming, 1.77, which is used for high definition (HD) television programming and digital video disc (DVD) content, 1.85, which is used for widescreen cinema, and 2.35, which is used for extra-widescreen cinema.

Since, when using the algorithm implemented by dual aspect ratio calculators 310*a-b*, only two aspect ratios are possible, N is optimally chosen as six for a primary screen aspect ratio of 2.1. This results in a new aspect ratio or second screen aspect ratio of 1.54. If the desired aspect ratio is 1.33, the new aspect ratio of 1.54 results in 13.9% of the screen area being wasted. If the desired aspect ratio is 1.77, the new aspect ratio of 1.54 results in 13.0% of the screen area being wasted. If the desired aspect ratio is 1.85, the new aspect ratio of 1.54 results in 11.9% of the screen area being wasted. And if the desired aspect ratio is 2.35, the new aspect ratio of 1.54 results in 10.6% of the screen area being wasted. Note that the screen area is wasted here due to letterboxing and is calculated according to Equation (5).

When using the algorithm implemented by multi-way aspect ratio calculators 320a-b, N is optimally chosen as 32 for a primary screen aspect ratio of 2.35. T is chosen as 9 to achieve a new aspect ratio of 1.33, which results in 6.8% of the screen area being wasted due to screen parts falling outside the viewable area. This area is equivalent to the shaded areas in FIGS. 5A-B. T is chosen as 5 to achieve a new aspect ratio of 1.72, the closest possible to 1.77, which results in 1.9% of the screen area being wasted due to screen parts falling outside the viewable area and 2.5% of the screen area being wasted due to letterboxing. T is chosen as 4 to achieve a new aspect ratio of 1.84, the closest possible to 1.85, which results in 1.1% of the screen area being wasted due to screen parts falling outside the viewable area and 1% of the screen area being wasted due to letterboxing. Since the primary screen is 2.35, the screen does not need to be altered for the case where the desired aspect ratio is 2.35. Note that the wasted area is calculated according to Equations (5) and (6).

When using the algorithm implemented by continuously adjustable aspect ratio calculators 330a-b, a primary screen aspect ratio of 2.35 is used. F is chosen as 0.277 to achieve a new aspect ratio of 1.33, which results in 7.6% of the screen area being wasted due to screen parts falling outside the viewable area. This area is equivalent to the shaded areas in FIG. 6. F is chosen as 0.14 to achieve a new aspect ratio of 1.77, which results in 2% of the screen area being wasted due to screen parts falling outside the viewable area. F is chosen as 0.12 to achieve a new aspect ratio of 1.85, which results in 1.4% of the screen area being wasted due to screen parts falling outside the viewable area. Since the primary screen is 2.35, the screen does not need to be altered for the case where the desired aspect ratio is 2.35. Note that the wasted area is calculated according to Equation (7).

Figure 9:
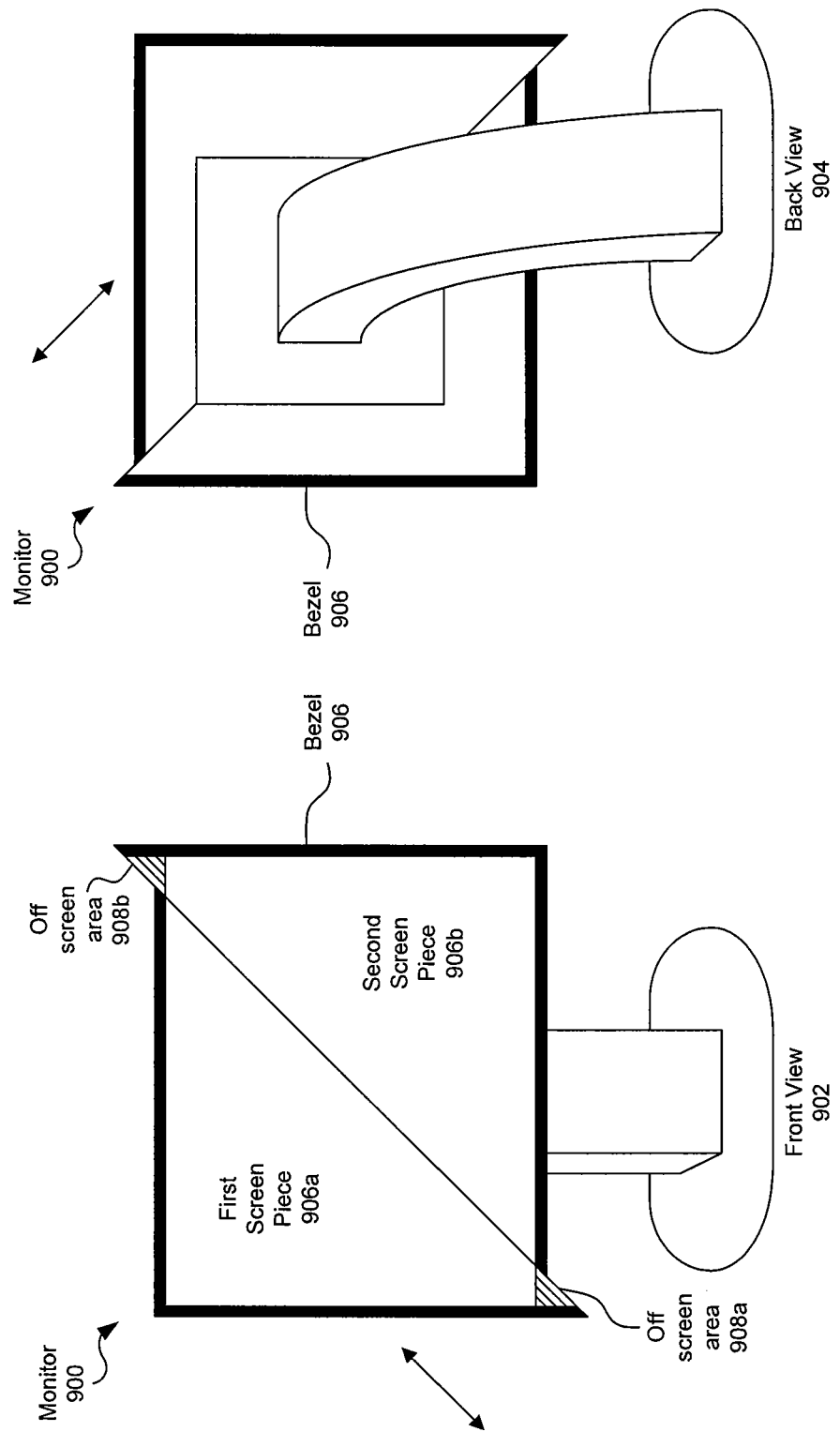
FIG. 9 is an example display according to an embodiment of the present invention.

FIG. 9 is an example display according to an embodiment of the present invention. As shown in FIG. 9, monitor 900 is cut into two halves: a first screen piece 906a and a second screen piece 906b. In an embodiment, since monitor 900 is cut into first screen piece 906a and second screen piece 906b by a linear line along its diagonal, as shown in front view 902, an aspect ratio for the screen of monitor 900 may be calculated by a continuously adjustable aspect ratio calculator, such as, for example, continuously adjustable aspect ratio calculators 330a-b of FIGS. 3A-B.

The viewable area of the screen of monitor 900 includes the area defined by first screen piece 906a and second screen piece 906b minus the area of bezel 906 and off screen areas 908a-b. In an embodiment, first screen piece 906a may slide along the diagonal cut. In an alternate embodiment, not shown, second screen piece 906a may slide along the diagonal cut. In another alternate embodiment, not shown, first screen piece 906a and second screen piece 906b may both slide along the diagonal cut.

The extent to which first screen piece 906a or second screen piece 906b can slide may be limited by the structural support of monitor 900, as shown in back view 904. Note that bezel 906 may also need to be cut in order to allow first screen piece 906a or second screen piece 906b to slide freely.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   (a) receiving, at a computer, a desired aspect ratio for a screen having a cut alone a diagonal of the screen resulting in a first and second half of the screen; and
   (b) determining an adjustment factor based on an original aspect ratio and the desired aspect ratio;
   (c) determining a new aspect ratio based on the adjustment factor; and
   (d) moving the first half of the screen relative to the second half of the screen along the cut to transform to the new aspect ratio, wherein the adjustment factor determines an extent of the moving.

2. The method of claim 1, wherein step (b) comprises:
   choosing a dual aspect ratio algorithm, wherein the dual aspect ratio algorithm calculates the adjustment factor that minimizes a letterboxed area of the screen based on the original aspect ratio and the desired aspect ratio.

3. The method of claim 1, wherein the cut is a staircase cut, and a number of segments in the staircase cut is based on the adjustment factor.

4. The method of claim 1, wherein step (b) comprises:
   choosing a multi-way aspect ratio algorithm, wherein the multi-way aspect ratio algorithm calculates the adjustment factor that minimizes a letterboxed area of the screen based on the original aspect ratio and the desired aspect ratio.

5. The method of claim 1 wherein:
   the cut is a staircase-cut,
   a number of vertical segments of the staircase-cut is based on the adjustment factor, and (d) comprises moving an upper half of the screen at least one step up on a lower half of the screen to transform to the new aspect ratio.

6. The method of claim 1, wherein determining an adjustment factor based on an original aspect ratio and the desired aspect ratio comprises using a continuously adjustable aspect ratio algorithm to determine an adjustment factor that minimizes a letterboxed area of the screen based on the original aspect ratio and the desired aspect ratio.

7. The method of claim 1 further comprising:
displaying a picture encoded in the new aspect ratio on the screen.

8. The method of claim 1, further comprising:
encoding a picture in the new aspect ratio using the screen, wherein the screen is a sensor on a capture device.

9. A system, comprising:
a graphics processing unit, that is configured to output a graphic at an original aspect ratio;
an adjustable screen having the original aspect ratio configured to display the graphic outputted by the graphics processing unit;
an aspect ratio calculator, coupled to the graphics processing unit, that is configured to receive a desired aspect ratio and determine an adjustment factor that minimizes a letterboxed area of the adjustable screen based on the original aspect ratio and the desired aspect ratio;
wherein the adjustable screen is configured to transform from the original aspect ratio to a new aspect ratio based on the adjustment factor, and
wherein the graphics processing unit is further configured to output outputs the graphic on the adjustable screen at the new aspect ratio following the transformation.

10. The system of claim 9, wherein the adjustable screen includes a staircase-cut along its diagonal, wherein a number of segments of the staircase-cut is based on the adjustment factor, and wherein a first half of the adjustable screen moves one step on a second half of the adjustable screen to transform to the new aspect ratio.

11. The system of claim 9, wherein the aspect ratio calculator includes a multi-way aspect ratio calculator.

12. The system of claim 9, wherein the adjustable screen includes a staircase-cut along its diagonal, wherein a number of segments of the staircase-cut is based on the adjustment factor, and wherein a first half of the adjustable screen moves at least one step on a second half of the adjustable screen to transform the adjustable screen to the new aspect ratio.

13. The system of claim 9, wherein the aspect ratio calculator includes a continuously adjustable aspect ratio calculator that is configured to calculate the adjustment factor that minimizes a letterboxed area of the adjustable screen based on the original aspect ratio and the desired aspect ratio.

14. The system of claim 13, wherein the adjustable screen includes a cut along a diagonal of the screen, wherein a first half of the screen slides relative to a second half of the screen along the cut to transform to the new aspect ratio, and wherein the adjustment factor determines an extent of the sliding.

15. A graphics processing unit, that is configured to output a graphic at an original aspect ratio:
an aspect ratio calculator, coupled to the graphics processing unit, that is configured to receive a desired aspect ratio and determine an adjustment factor based on the original aspect ratio and the desired aspect ratio;
an adjustable screen configured to transform from the original aspect ratio to a new aspect ratio based on the adjustment factor, wherein the adjustable screen is transformed to the new aspect ratio by a user, and
wherein the graphics processing unit is further configured to output the graphic on the adjustable screen at the new aspect ratio following the transformation.

16. The system of claim 9, wherein the adjustable screen automatically transforms to the new aspect ratio upon receiving a signal from the aspect ratio calculator.

17. A system, comprising:
a sensor having an adjustable surface, the sensor being configured to capture an image;
an aspect ratio calculator configured to, calculate an adjustment factor based on a current aspect ratio of the adjustable surface and a desired aspect ratio of the adjustable surface, wherein the adjustable surface is further configured, upon the receipt of a signal, to transform to the desired aspect ratio based on the adjustment factor, wherein the adjustable surface includes a cut along its diagonal, wherein a first half of the adjustable surface slides relative to a second half of the adjustable surface along the cut to transform the adjustable surface to the new aspect ratio, and wherein the adjustment factor determines an extent of the sliding;
a memory, coupled to the sensor, the memory being configured to store the image captured by the sensor.

18. The system of claim 17, wherein the adjustable surface includes a staircase-cut along its diagonal, wherein a number of segments of the staircase-cut is based on the adjustment factor, and wherein the transform to the desired aspect ratio comprises having a first half of the adjustable surface move at least one step on a second half of the adjustable surface.

19. The system of claim 17, wherein the adjustable surface includes a staircase-cut along its diagonal, wherein a number of segments of the staircase-cut is based on the adjustment factor, and wherein a first half of the adjustable surface moves at least one step on a second half of the adjustable surface to transform the surface to the new aspect ratio.

20. The system of claim 17, wherein the adjustable surface is transformed to the new aspect ratio by a user.

21. The system of claim 17, wherein the adjustable surface automatically transforms to the new aspect ratio upon receiving a signal from the aspect ratio calculator.

\* \* \* \* \*

UNITED STATES PATENT AND TRADEMARK OFFICE
CERTIFICATE OF CORRECTION

PATENT NO. : 8,237,857 B1
APPLICATION NO. : 12/560961
DATED : August 7, 2012
INVENTOR(S) : Ankur Bhargava It is certified that error appears in the above-identified patent and that said Letters Patent is hereby corrected as shown below:

In the Claims:

Column 14
Line 40, Claim 1, replace "alone" with --along--.

Column 15
Line 31, Claim 9, replace "output outputs" with --output--.

Column 16
Line 22, Claim 17, replace "configured to," with --configured to--.

Signed and Sealed this
Thirtieth Day of April, 2013

Teresa Stanek Rea
*Acting Director of the United States Patent and Trademark Office*